United States Patent [19]

Frank et al.

[11] Patent Number: 5,974,042
[45] Date of Patent: Oct. 26, 1999

[54] SERVICE DETECTION CIRCUIT AND METHOD

[75] Inventors: Colin D. Frank, Chicago; Jennifer A. Honkisz, Schaumburg; Brian D. Storm, Round Lake Beach, all of Ill.

[73] Assignee: Motorola, Inc., Schaumburg, Ill.

[21] Appl. No.: 08/808,446

[22] Filed: Feb. 28, 1997

[51] Int. Cl.⁶ .................................................. H04B 7/26
[52] U.S. Cl. ......................... 370/342; 370/441; 375/200; 375/209
[58] Field of Search .................................. 370/320, 335, 370/342, 441, 252; 375/200, 207, 208, 209, 343

[56] References Cited

U.S. PATENT DOCUMENTS

| | | | |
|---|---|---|---|
| 5,533,047 | 7/1996 | Mourot et al. | 375/208 |
| 5,680,414 | 10/1997 | Durrant et al. | 375/208 |

FOREIGN PATENT DOCUMENTS

| | | | |
|---|---|---|---|
| 2318952 | 5/1998 | United Kingdom. | |
| WO 97/31503 A1 | 8/1997 | WIPO. | |

OTHER PUBLICATIONS

Imbeaux, Jean–Claude, *IEEE Journal on Selected Areas in Communications*, "Performances of the Delay–Line Multiplier Circuit for Clock and Carrier Synchronization in Digital Satellite Communications", vol. SAC1, Jan. 1983, pp. 82–95.

Kuehls et al., *IEEE Journal on Selected Areas in Communications*, "Presence Detection of Binary–Phase–Shift–Keyed and Direct–Sequence Spread–Spectrum Signals Using a Prefilter–Delay–and–Multiply Device", vol. 8, No. 5, Jun. 1990, pp. 915–933.

Peterson et al., *Introduction to Spread Spectrum Communications*, Section 10–6: Estimation of Spread–Spectrum Signal Parameters, IEEE, 1988, pp. 605–611.

Reed et al., *IEEE Transactions on Communications*, "Minimization of Detection of Symbol–Rate Spectral Lines by Delay and Multiply Receivers", 1988, pp. 118–120.

M. A. Wickert, Appendix A: The Calculation of the Delay and Multiply Receiver Output Power Spectral Density, University of Colorado thesis paper, pp. A–1 to A–22.

*Primary Examiner*—Chi H. Pham
*Assistant Examiner*—Frank Duong
*Attorney, Agent, or Firm*—Donald C. Kordich; Lalita P. Williams

[57] ABSTRACT

A radiotelephone (121) employs a service detection circuit (125) comprising at least one chip-rate detector (109) that measures the energy of the autocorrelation of a received composite CDMA signal and employs a different time delay for each measurement of the energy. A threshold detection circuit (127) combines the measured energies and determines that service is available if the combined energies exceeds a threshold, and determines service is unavailable otherwise. The chip-rate detectors (109) can be coupled in parallel to provide simultaneous measurements of the energy of the autocorrelation of the received composite CDMA signal, or a single chip-rate detector (109) can serially measure the energy of the autocorrelation of the received composite CDMA signal.

18 Claims, 2 Drawing Sheets

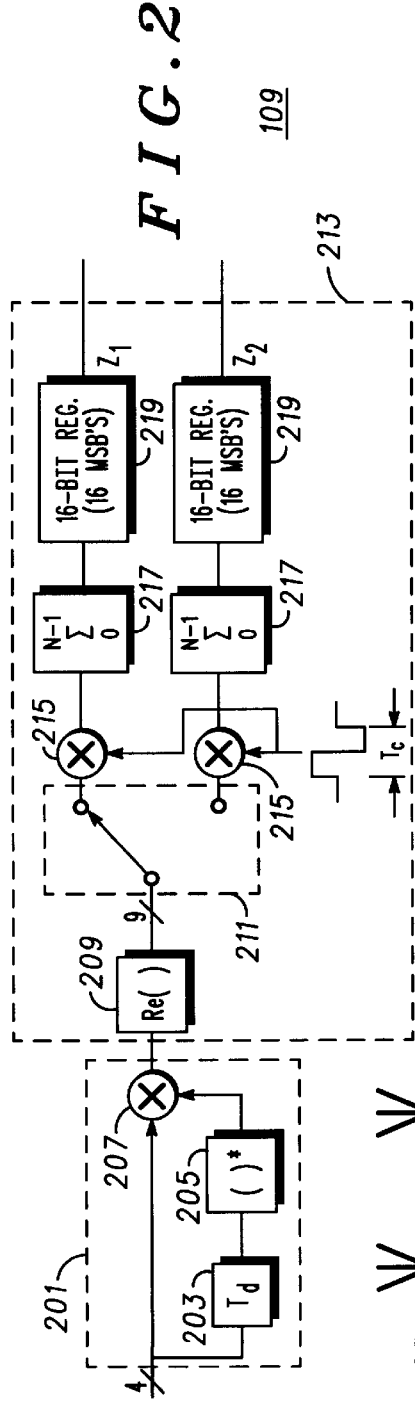
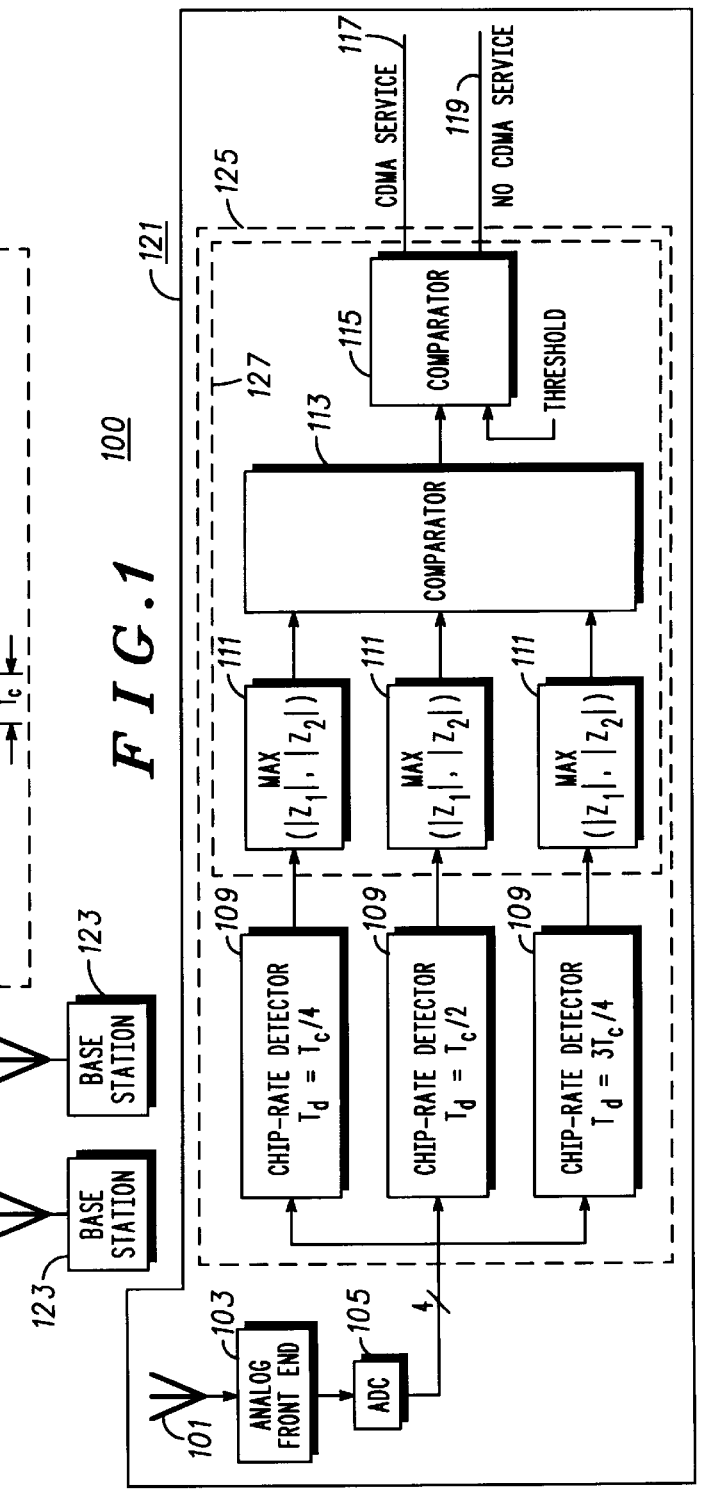

SERVICE DETECTION CIRCUIT AND METHOD

FIELD OF THE INVENTION

The present invention relates generally to the field of digital communication, and more particularly to a method of and circuit for detecting the availability of Code-Division Multiple Access (CDMA) service. Although the invention is subject to a wide range of applications, it is especially suited for use in radiotelephone devices, and will be particularly described in that connection.

BACKGROUND OF THE INVENTION

Interim Standard IS-95-A (IS-95) has been adopted by the Telecommunications Industry Association for implementing CDMA in a cellular system or personal communication system (PCS). In the CDMA system, a mobile station communicates with any one or more of a plurality of base stations dispersed in a geographic region. Each base station continuously transmits over a Pilot Channel a pilot channel signal having the same spreading code but with a different code phase offset. IS-95 defines the spreading code as a pseudo-random bits (PN) sequence having a period $2^{15}$ chips, and phase offset as a multiple of 64 chips relative a zero-offset pilot PN sequence. Phase offset allows the pilot channel signals to be distinguished from one another. The PN bits ("chips") are generated at a data rate ("chip rate") of 1.23 megabits per second.

CDMA service may not be available in all regions. Thus, when a CDMA-capable mobile station is either turned on or carried into a new region, the mobile station must determine whether or not CDMA service is available. One method of determining the availability of CDMA service is to attempt to acquire a pilot channel signal using an exhaustive scan of the pilot code space for each potential CDMA frequency. A mobile station makes a pilot channel acquisition by acquiring the phase offset of the spreading code of a particular pilot channel signal. If the pilot channel signal can be acquired, IS-95 service is available; otherwise, service is not available.

This pilot acquisition method is suitable in when CDMA service is available on the first frequency attempted. When CDMA service is not available, however, the process of scanning can take as long as 15 seconds per frequency. This problem is compounded by each region having a potential of four or more frequency bands allocated for CDMA service. Consequently, service detection can take a minute or longer. As a result, a user wanting to make a call on the mobile station could wait up to a minute to make the call or to discover that a call can not be made on a CDMA system.

Another method of determining whether CDMA service is available is to detect the chip rate of the composite CDMA signal received by the mobile station rather than acquiring a pilot channel signal. This operation can be done in parallel with the pilot code space scan to quickly establish whether to continue the scan or abort and move to the next frequency, or to try another service such as Advanced Mobil Phone Service. A conventional chip-rate detector comprises a delay-and-multiply circuit that performs an auto-correlation by multiplying the received composite CDMA signal by the conjugate of the composite received CDMA signal delayed by a time $T_d$. If CDMA service is available, the received signal and the conjugate of the delayed received signal will be correlated, thus the mean output of the delay-and-multiply circuit will be an autocorrelation signal that is periodic with a period equal to the inverse of the chip rate. Conversely, if CDMA service is not available, the mean output of the delay-and-multiply circuit will be the autocorrelation of noise, which is not periodic.

To further refine the detection, a conventional CDMA service detector includes a bandpass filter to filter the output of the delay-and-multiply circuit. The bandpass filter can be a software-implemented digital Fast Fourier Transform (FFT) with its passband centered at the chip rate. Furthermore, an energy measurement circuit measures the energy of the filtered output. The measured energy is compared to a threshold, and, if the measured energy exceeds the threshold, then CDMA service is available. Otherwise, CDMA service is unavailable.

A problem with the conventional CDMA service detector lies in the delay-and-multiply circuit. The performance of the delay-and-multiply circuit depends upon many factors, including the chip waveform, cochannel interference of the multiple pilot channel signals transmitted over the Pilot Channel and the multiple traffic channel signals over the Traffic Channels, multipath propagation, and the delay chosen for the delay-and-multiply circuit.

Some chip waveforms are designed specifically to "hide" the signal, i.e., the delay-and-multiply circuit is not able to provide a high correlation because of the particular waveform, but this is usually not a concern in a cellular system or a PCS. The interference of the multiple pilot channel signals and their multipath components combining at the receiver, however, is a concern.

Because multiple pilot channel signals and multiple traffic channel signals, and their multipath components, combine at the receiver to create a time-varying signal, in the same region where CDMA service is available, the conventional chip-rate detector performance will indicate CDMA service is available at some locations, while at other locations the conventional chip-rate detector will indicate CDMA service is not available. This results in a user's lack of confidence in the determination made by the CDMA service detector.

A need therefore exists for a method of and circuit for detecting the availability of CDMA service that reduces the time to determine whether service is available as compared to the pilot-acquisition method, and is less sensitive to cochannel interference and multipath propagation than the conventional chip-rate detector.

BRIEF DESCRIPTION OF THE DRAWINGS

FIG. 1 is an electrical block diagram of a wireless communication system configured according to the invention.

FIG. 2 is an electrical block diagram of a chip-rate detector shown in FIG. 1, configured according to the invention.

DESCRIPTION OF THE PREFERRED EMBODIMENTS

Figure 3:
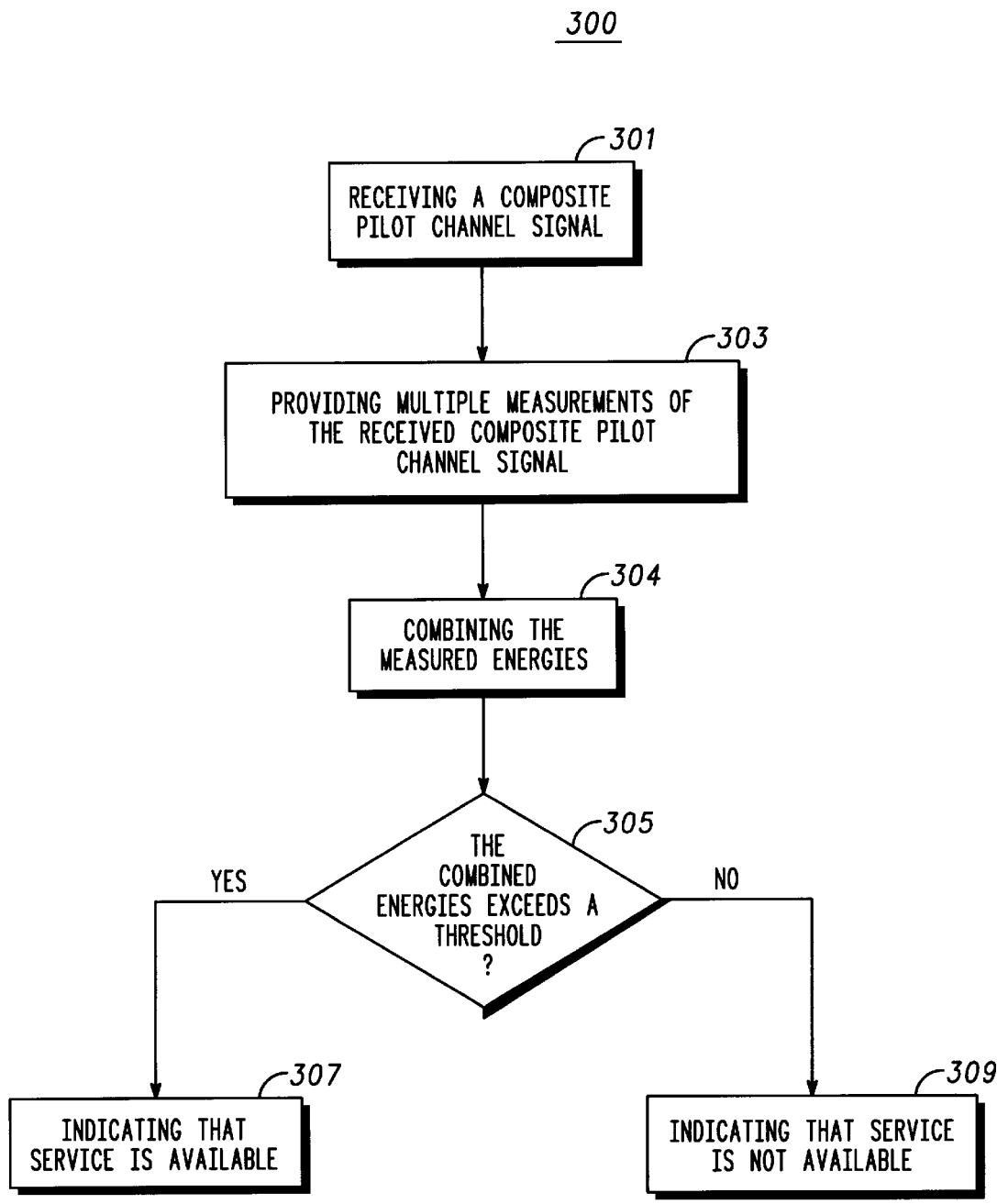
FIG. 3 is a flow chart of an operation of the service detection circuit in according to the invention.

The method of and circuit for detecting the availability of CDMA service described herein provide advantages over known service detection circuits and methods in that it reduces the time to determine whether service is available and is less sensitive to the combination of multiple channels and multipath components at the receiver.

According to the present invention, the foregoing advantages are principally provided by a service detection circuit comprising at least one chip-rate detector that measures the energy of the autocorrelation of the composite CDMA signal by using a different time delay for each measurement. Further, a threshold detection circuit combines the measured energies and determines that service is available if the combined energies exceeds a threshold, and determines service is unavailable otherwise. Multiple measurements of the received composite CDMA signal, at different time delays, results in a greater likelihood that at least one of the measurements will not be unduly influenced by cochannel interference and multipath propagation to give a false indication of CDMA service unavailability.

In accordance with another aspect of the invention, at least two chip-rate detectors, coupled in parallel, provide the measurements of the energy of the autocorrelation of the composite CDMA signal. In accordance with another aspect of the invention, one chip-rate detector serially measures the energy of the autocorrelation of the composite CDMA signal.

In accordance with another aspect of the invention, the chip-rate detector comprise a delay-and-multiply circuit that receives samples of the composite CDMA signal at $2^M$ times the chip rate and produces an autocorrelation signal. Further, a bandpass filter has its passband encompassing the chip rate, to filter the autocorrelation signal and provide the measurement of the energy of the autocorrelation of the composite CDMA signal.

In accordance with another aspect of the invention, the bandpass filter comprises a commutator for receiving the autocorrelation signal and sequentially applying the autocorrelation signal every $\frac{1}{2}^M$ the chip period to $2^{M-1}$ circuit paths. Each circuit path comprises a multiplier for multiplying the autocorrelation signal applied by the commutator by a binary-valued square wave operating at the chip rate to produce a multiplied output, and a summer for summing N consecutive samples of the multiplied output. The sum of the N consecutive samples is the measurement of the energy of the autocorrelation of the received composite CDMA signal.

In accordance with a method of this invention, receiving a composite CDMA signal, providing a plurality of measurements of the energy of the autocorrelation of the received composite CDMA signal, each measurement derived by employing a different time delay, combining the measured energies, determining if the combined energies exceeds a threshold, and indicating that service is available provided that the combined energies exceeds the threshold.

The plurality of measurements of the energy of the autocorrelation of the received composite CDMA signal can be provided simultaneously or serially.

The method more particularly comprises the steps of multiplying the composite CDMA signal by a time-delayed conjugate of the received composite CDMA signal to produce an autocorrelation signal, and filtering the autocorrelation signal.

Additional advantages and novel features of the invention will be set forth in part in the description which follows, wherein only the preferred embodiments of the invention have been described, and in part become apparent to those skilled in the art upon examination of the following detailed description or may be learned by practice of the invention. The invention is capable of other and different embodiments, and its several details are capable of modification, all without departing from the scope of the invention. The advantages of the invention may be realized and attained by means of the instrumentalities and combinations particularly pointed out in the appended claims.

Reference will now be made in detail to the first embodiment configured according to the present invention.

FIG. 1 is a an electrical block diagram of a wireless communication system 100 employing a wireless communication device, for example, a radiotelephone 121, configured according to the invention. This figure illustrates, among other things, that radiotelephone 121 employs multiple chip-rate detectors 109 coupled in parallel that measure the chip-rate spectral content of the autocorrelation of the received composite CDMA signal at different time delays.

An antenna 101 receives signals from a plurality of base stations 123. Each base station 123 transmits a pilot channel signal and multiple traffic channel signals at the allocated radio frequencies, such as at the 800–900 MHz cellular band or the 1800–1900 MHz PCS band. The pilot channel signals and the traffic channel signals, and their multipath components, combine at the receiver to form a composite CDMA signal that is time varying. An analog front end 103 down converts the composite CDMA signal to base band level and provides the down-converted composite CDMA signal to an analog-to-digital converter (ADC) 105. ADC 105 digitizes the signal and provides it to a CDMA service detection circuit 125.

Service detection circuit 125 includes at least one chip-rate detector 109 that receives the digitized composite CDMA signal and measures the chip-rate spectral content of the received composite CDMA signal. The at least one chip-rate detector 125 employs a different time delay for each measurement of the chip-rate spectral content of the autocorrelation of the received composite CDMA signal. In the embodiment shown in FIG. 1, the at least one chip-rate detector 109 comprises three chip-rate detectors 109 coupled in parallel, and each chip-rate detector 109 simultaneously receives the composite CDMA signal and simultaneously measures the chip-rate spectral content of the autocorrelation of the received composite CDMA signal.

In another embodiment, the at least one chip-rate detector 109 is one chip-rate detector 109 that serially measures the chip-rate spectral content of the autocorrelation of the received composite CDMA signal. The time delay is varied for each measurement to obtain separate measurements of the chip-rate spectral content.

Referring to FIG. 2, chip-rate detector 109 comprises a delay-and-multiply circuit 201 that receives 4-bit samples of the real and imaginary parts of the digitized composite CDMA signal at $2^M$ times the chip rate. In the preferred embodiment, M is chosen as 2 and the rate at which the signal is thus received is 4 times the chip rate. This is the lowest sampling rate for an acceptable resolution using a time delay $T_d$ of a quarter-fractional multiple of the chip period, namely, one-fourth, one-half, and three-fourths of a chip period $T_c$. The time delays depend upon the sampling rate. Other sampling rates and time delays may be chosen to reduce the effects of the combination of the pilot channel signals and the traffic channel signals, and their multipath components, at the receiver. For example, the sampling rate can be 8 times the chip rate and the time delays an eighth-fractional multiple of the chip period $T_c$, or the samples may exceed one chip period, such as, five-fourths, six-fourths, etc., of a chip period.

The composite CDMA signal is routed through a time-delay circuit 203, which applies a time delay to the routed signal, and through a conjugate circuit 205, which takes the complex conjugate of the time-delayed signal. The time-delayed, conjugate composite CDMA signal is multiplied with the composite CDMA signal in a multiplier 207 to produce an autocorrelation signal.

Chip-rate detector 109 further comprises a bandpass filter 213, having its passband encompassing the chip rate, that filters the autocorrelation signal and provides the measurement of the chip-rate spectral content of the autocorrelation of the received composite CDMA signal. The bandpass filter shown in FIG. 2 is a simplified hardware implementation of an FFT, and results in a quick filtering process. This particular bandpass filter only determines the spectral content of the delay-and-multiply circuit's output at the chip rate. Other bandpass filters, such as a software-implemented filter, may be substituted.

In FIG. 2, bandpass filter 213 comprises a real operator 209 that receives the autocorrelation signal and determines the real part of the autocorrelation signal. In the preferred embodiment, only the real part is used because the imaginary part of the autocorrelation signal has little or no signal component at the chip rate. A commutator 211 receives the real part of the autocorrelation signal and sequentially applies it, every $\frac{1}{2}^M$ of the chip period, to $2^{M-1}$ circuit paths. Each circuit path comprises a multiplier 215 that multiplies the autocorrelation signal, applied by commutator 211 to multiplier 215, by a binary-valued square wave operating at the chip rate (a period of $T_c$) to produce a multiplied output.

For example, for a sampling rate of 4 times the chip rate (M equals 2), commutator 211 applies the autocorrelation signal to the top circuit path for a quarter-chip period and the multiplier 215 multiplies the autocorrelation signal by the +1 value of the binary square wave. For the next quarter-chip period, commutator 211 applies the autocorrelation signal to the bottom circuit path for a quarter-chip period and the multiplier 215 multiplies the autocorrelation signal by the +1 value of the binary square wave. On the next quarter-chip period, commutator 211 applies the autocorrelation signal to the top circuit path for a quarter-chip period and the multiplier 215 multiplies the autocorrelation signal by the -1 value of the binary square wave. For the last quarter-chip period, commutator 211 applies the autocorrelation signal to the bottom circuit path for a quarter-chip period and the multiplier 215 multiplies the autocorrelation signal by the -1 value of the binary square wave. In effect, the -1 and +1 values are the FFT coefficients applied to the commutated autocorrelation signal.

One of ordinary skill in the art will recognize that there are circuits other than the mixer for applying a -1 value to the autocorrelation signal, for example, an inverter with a gain of -1.

In each circuit path, a summer 217 sums N consecutive samples of the multiplied output to produce a filtered autocorrelation signal. The sum of the N consecutive samples is the measurement of the chip-rate spectral content of the autocorrelation of the received composite CDMA signal.

The bandwidth of the bandpass filter is controlled by the choice of N, which can be set equal to, for example, 1024, 2048, 4096, or 8192. The bandwidth of the bandpass filter decreases with N, while the sensitivity of the chip-rate detector increases with N.

There are two measures of the chip-rate spectral content of the autocorrelation of the received composite CDMA signal, $Z_1$ and $Z_2$, in this particular embodiment of the chip-rate detectors. $Z_1$ represents the real part of the chip-rate spectral content and $Z_2$ represents the imaginary part of the chip-rate spectral content. The chip-rate spectral energy of the autocorrelation of the received composite CDMA signal is the sum of the squares of these two parts. One of ordinary skill can appreciate that any one or both of the absolute value of the chip-rate spectral content components—$Z_1$ and $Z_2$—or the chip-rate spectral energy can be measures of energy, as well as others. "Energy" as used herein can encompass the aforementioned measures as well as maximum, average, etc., measures of the chip-rate spectral content and the chip-rate spectral energy.

Each circuit path further comprises a 16-bit register 219 for receiving and holding the value of the summed N consecutive samples.

Referring back to FIG. 1, service detection circuit 125 further includes a threshold detection circuit 127 for combining the measured energies and determining if the combined energies exceeds a threshold. If the combined energies exceeds the threshold, then service is available and an indication is provided on line 117. If otherwise, service is unavailable and an indication is provided on line 119. A threshold value is selected that provides a desired probability of false alarm and probability of missed detection for a given N used in the summer 217.

In the embodiment shown in FIG. 1, threshold detection circuit 127 comprises comparators 111 for determining the maximum absolute value of the chip-rate spectral content components, and another comparator 113 for determining the maximum of these maximums. Finally, a comparator 115 compares the maximum absolute value of the chip-rate spectral content components against the threshold.

In the alternate embodiment employing a single chip-rate detector having an adjustable time delay to make serial measurements, threshold detection circuit 127 comprises six registers for storing each measured value of the chip-rate spectral content components, and a single comparator that compares the stored values of the six registers with the threshold.

One of ordinary skill in the art will appreciate that maximum absolute chip-rate spectral energy, as well as other combined energies, could also be compared to the threshold to determine whether CDMA service is available. For example, the sum of the absolute value of all of six of the chip-rate spectral components can be compared to the threshold, as well as the sum of the squares of all of six of the chip-rate spectral components.

The method of use and operation of the service detection circuit constructed as described above will now be described with reference to FIG. 3. A method 300 of service detection comprises the steps of receiving a composite CDMA signal, (step 301), providing a plurality of measurements of the energy of the received composite CDMA signal, (step 303), each energy measurement derived by employing a different time delay, combining the measured energies, (step 304), determining if the combined energies exceeds the threshold, (step 305), and indicating that service is available provided that the combined energies exceeds the threshold, (step 307). If the combined energies exceeds the threshold, indicating that service is unavailable. (Step 309.)

In one embodiment, the step of providing a plurality of measurements of the energy of the received composite CDMA signal, (step 303), comprises, for each energy measurement, the substeps of multiplying the composite CDMA signal by a time-delayed conjugate of the received composite CDMA signal to produce an autocorrelation signal, and filtering the autocorrelation signal. Furthermore, the plurality of measurements of the energy of the received composite CDMA signal are provided simultaneously or serially.

Those skilled in the art will recognize that various modifications and variations can be made in the method, service detection circuit, and radiotelephone of the present invention and in its construction without departing from the scope or spirit of this invention.

In summary, service detection circuits and methods have been described that provide advantages over known service detection circuits and methods in that the time to determine whether service is available is reduced and sensitivity to the combination of multiple channels and multipath components combining at the receiver has been reduced. Furthermore, the chip-rate detector is highly flexible having an adjustable $T_d$ and bandwidth and sensitivity controlled by N, and is a simplified implementation. The foregoing advantages are principally provided by a service detection circuit comprising at least one chip-rate detector that measures the energy of the received composite CDMA signal with a different time delay for each measurement of the energy.

What is claimed is:

1. A service detection circuit for detecting the availability of CDMA service in a region, the service detection circuit comprising:
    at least one chip-rate detector for receiving a composite CDMA signal and for measuring the energy of the autocorrelation of the received composite CDMA signal, wherein the at least one chip-rate detector employs a different time delay for each measurement of the energy of the autocorrelation of the received composite CDMA signal; and
    a threshold detection circuit for combining the measured energies and for determining if the combined energies exceeds a threshold, wherein if the combined energies exceeds the threshold, then service is available, and, if otherwise, service is unavailable.

2. The service detection circuit of claim 1 wherein the at least one chip-rate detector comprises at least two chip-rate detectors coupled in parallel and each chip-rate detector simultaneously receives the composite CDMA signal and simultaneously measures the energy of the autocorrelation of the received composite CDMA signal.

3. The service detection circuit of claim 2, the composite CDMA signal comprises a plurality of pilot channel signals each having a chip period and a chip rate, wherein a one of the at least two chip-rate detectors comprises:
    a delay-and-multiply circuit that receives samples of the composite CDMA signal at $2^M$ times the chip rate and multiplies the samples of the composite CDMA signal by the conjugate of the received composite CDMA signal delayed by its respective time delay to produce an autocorrelation signal; and
    a bandpass filter having its passband encompassing the chip rate, for filtering the autocorrelation signal and providing the measurement of the energy of the autocorrelation of the received composite CDMA signal.

4. The service detection circuit of claim 3 wherein the bandpass filter comprises:
    a commutator for receiving the autocorrelation signal and sequentially applying, every $\frac{1}{2}^M$ of the chip period, the autocorrelation signal; and
    $2^{M-1}$ circuit paths, each circuit path comprising,
        a multiplier for multiplying the autocorrelation signal applied by the commutator to the multiplier by a binary-valued square wave operating at the chip rate to produce a multiplied output; and
        a summer for summing N consecutive samples of the multiplied output to produce a filtered autocorrelation signal, wherein the sum of the N consecutive samples is the measurement of the energy of the received composite CDMA signal.

5. The service detection circuit of claim 4, wherein the M equal 2, and one summer provides the real part of the energy measurement and another summer provides the imaginary part of the energy measurement.

6. The service detection circuit of claim 4, wherein the bandpass filter further comprises a real operator for receiving the autocorrelation signal and for determining the real part of the autocorrelation signal, wherein the commutator receives only the real part of the autocorrelation signal and sequentially applies, every $\frac{1}{2}^M$ of a chip period, the real part of the autocorrelation signal.

7. The service detection circuit of claim 4, wherein each $2^{M-1}$ circuit path further comprises a register for receiving and holding the value of the summed N consecutive samples, wherein the held value is the measurement of the energy of the autocorrelation of the received composite CDMA signal.

8. The service detection circuit of claim 1 wherein the at least one chip-rate detector is one chip-rate detector that serially measures the energy of the autocorrelation of the received composite CDMA signal.

9. The service detection circuit of claim 8, the composite CDMA signal comprising a plurality of individual pilot channel signals each having a chip period and a chip rate, wherein the one chip-rate detector comprises:
    a delay-and-multiply circuit that receives samples of the composite CDMA signal at $2^M$ times the chip rate and multiplies the samples of the composite CDMA signal by the conjugate of the received composite CDMA signal delayed by its respective time delay to produce an autocorrelation signal; and
    a bandpass filter having its passband encompassing the chip rate, for filtering the autocorrelation signal and providing the measurement of the energy of the autocorrelation of the received composite CDMA signal.

10. A service detection circuit for detecting the availability of CDMA service in a region, the service detection circuit comprising:
    a plurality of chip-rate detectors coupled in parallel, each chip-rate detector receiving a composite CDMA signal and simultaneously measuring the energy of the autocorrelation of the received composite CDMA signal, wherein each chip-rate detector employs a different time delay in measuring the energy; and
    a threshold detection circuit for combining the measured energies and for determining if the combined energies exceeds a threshold, wherein if the combined energies exceeds the threshold, then service is available, and, if otherwise, service is unavailable.

11. A service detection circuit for detecting the availability of CDMA service in a region, the service detection circuit comprising:
    a chip-rate detector for receiving a composite CDMA signal and for serially measuring the energy of the autocorrelation of the received composite CDMA signal, wherein the chip-rate detector employs a different time delay for each energy measurement; and
    a threshold detection circuit for combining the measured energies and for determining if the combined energies exceeds a threshold, wherein if the combined energies exceeds the threshold, then service is available, and, if otherwise, service is unavailable.

12. A method of service detection comprising the steps of;
    receiving a composite CDMA signal;
    providing a plurality of measurements of the energy of the autocorrelation of the received composite CDMA signal, each energy measurement derived by employing a different time delay;

combining the measured energies;

determining if the combined energies exceeds a threshold; and indicating that service is available provided that the combined energies exceeds the threshold.

13. The method of claim 12 wherein the step of providing a plurality of measurements of the energy of the autocorrelation of the received composite CDMA signal comprises, for each energy measurement, the substeps of:

multiplying the received composite CDMA signal by a time-delayed conjugate of the received composite CDMA signal to produce an autocorrelation signal; and filtering the autocorrelation signal.

14. The method of claim 13 wherein the plurality of measurements of the energy of the autocorrelation of the received composite CDMA signal are provided simultaneously.

15. The method of claim 12 wherein the plurality of measurements of the energy of the autocorrelation of the received composite CDMA signal are provided serially.

16. A wireless communication device comprising:

an antenna for receiving a composite CDMA signal;

an analog front end for down converting the composite CDMA signal;

an analog-to-digital converter for digitizing the down-converted composite CDMA signal; and a service detection circuit comprising, at least one chip-rate detector for receiving the digitized composite CDMA signal and for measuring the energy of the autocorrelation of the digitized composite CDMA signal, wherein the at least one chip-rate detector employs a different time delay for each measurement of the energy of the autocorrelation of the digitized composite CDMA signal; and a threshold detection circuit for combining the measured energies and for determining if the combined energies exceeds a threshold, and, if the combined energies exceeds the threshold, then for providing an indication that service is available, and, if otherwise, for providing an indication that service is unavailable.

17. The wireless communication device of claim 16 wherein the at least one chip-rate detector comprises at least two chip-rate detectors coupled in parallel and each chip-rate detector simultaneously receives the composite CDMA signal and simultaneously measures the received composite CDMA signal.

18. The wireless communication device of claim 16 wherein the at least one chip-rate detector is one chip-rate detector that serially measures the energy of the autocorrelation of the received composite CDMA signal.

* * * * *